(12) United States Patent
Zheng et al.

(10) Patent No.: US 12,348,820 B2
(45) Date of Patent: Jul. 1, 2025

(54) DATA INTERACTION METHOD, ELECTRONIC DEVICE, AND STORAGE MEDIUM

(71) Applicant: Beijing Zitiao Network Technology Co., Ltd., Beijing (CN)

(72) Inventors: Yi Zheng, Beijing (CN); Yue Ben, Beijing (CN); Qing Song, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/389,727

(22) Filed: Dec. 19, 2023

(65) Prior Publication Data

US 2024/0121476 A1 Apr. 11, 2024

Related U.S. Application Data

(63) Continuation of application No. PCT/CN2022/110439, filed on Aug. 5, 2022.

(30) Foreign Application Priority Data

Aug. 11, 2021 (CN) .......................... 202110921093.1

(51) Int. Cl.
*H04N 7/173* (2011.01)
*H04N 21/45* (2011.01)
*H04N 21/466* (2011.01)
*H04N 21/472* (2011.01)
*H04N 21/478* (2011.01)

(52) U.S. Cl.
CPC ... *H04N 21/47202* (2013.01); *H04N 21/4524* (2013.01); *H04N 21/4668* (2013.01); *H04N 21/47815* (2013.01)

(58) Field of Classification Search
CPC ......... H04N 21/47815; H04N 21/4524; H04N 21/4668; H04N 21/47202
See application file for complete search history.

(56) References Cited

U.S. PATENT DOCUMENTS

| 10,176,448 B1* | 1/2019 | Rhodes .................... G01S 19/14 |
| 2018/0336605 A1* | 11/2018 | Volta ...................... G06Q 30/02 |

(Continued)

FOREIGN PATENT DOCUMENTS

| CN | 105654366 A | 6/2016 |
| CN | 105844494 A | 8/2016 |

(Continued)

OTHER PUBLICATIONS

A translation version of CN111222042A, Chen et al., Jun. 2, 2020 (Year: 2020).*

(Continued)

*Primary Examiner* — Gigi L Dubasky

(57) ABSTRACT

There is provided a data interaction method and apparatus, a device, and a storage medium. The data interaction method comprises: presenting a video stream containing a recommended object and a preset control in a video stream push page of a preset application; receiving a first trigger operation acting on the preset control; and in response to the first trigger operation, display a first page corresponding to the recommended object, wherein the instant delivery service for the recommended object is provided on the first page.

17 Claims, 6 Drawing Sheets

(56) References Cited

U.S. PATENT DOCUMENTS

| | | | | |
|---|---|---|---|---|
| 2019/0370742 A1* | 12/2019 | Ko | .................... | G06Q 10/0835 |
| 2020/0160428 A1* | 5/2020 | Calvo | ................ | G06Q 30/0633 |
| 2020/0258140 A1* | 8/2020 | Xu | ........................ | G06V 20/40 |
| 2022/0303605 A1 | 9/2022 | Zhang | | |
| 2022/0309557 A1* | 9/2022 | Donnels | ............. | G06Q 30/0255 |

FOREIGN PATENT DOCUMENTS

| | | | | |
|---|---|---|---|---|
| CN | 107682717 | A | | 2/2018 |
| CN | 110097429 | A | | 8/2019 |
| CN | 111222042 | A | * | 6/2020 |
| CN | 111259257 | A | | 6/2020 |
| CN | 112040250 | A | | 12/2020 |
| CN | 112070569 | A | | 12/2020 |
| CN | 112399200 | A | | 2/2021 |
| CN | 113034226 | A | | 6/2021 |
| CN | 113608650 | A | | 11/2021 |
| WO | 2021129000 | A1 | | 11/2021 |

OTHER PUBLICATIONS

Communication Pursuant to Rules 70(2) and 70a(2) EPC for European Application No. 22855336.8, mailed Nov. 6, 2024, 1 page.
Extended European Search Report for European Application No. 22855336.8, mailed Oct. 18, 2024, 10 pages.
International Search Report and Written Opinion for International Application No. PCT/CN2022/110439, mailed Oct. 26, 2022, 15 pages.

* cited by examiner

DATA INTERACTION METHOD, ELECTRONIC DEVICE, AND STORAGE MEDIUM

CROSS-REFERENCE OF RELATED APPLICATION

This application is a continuation application of International Application No. PCT/CN2022/110439, filed on Aug. 5, 2022, which is based on and claims the benefit of China Patent Application 202110921093.1 filed on Aug. 11, 2021, the disclosures of both of the aforementioned applications are hereby incorporated into this disclosure by reference in their entireties.

FIELD OF THE INVENTION

The present disclosure relates to the field of Internet technology, such as data interaction method, apparatus, device and storage medium.

BACKGROUND

With the rapid development of information technology and the popularity of mobile Internet, applications can provide users with more and more network information, generally, when users do not have explicit search intentions, applications can recommend information to users in a manner of pushing video streams.

DISCLOSURE OF THE INVENTION

The present disclosure provides data interaction methods, apparatus, storage medium and device, which can optimize data interaction solutions.

This disclosure provides a data interaction method, including:
  presenting a video stream containing a recommended object and a preset control in a video stream push page of a preset application, where the recommended object supports an instant delivery service;
  receiving a first trigger operation acting on the preset control;
  in response to the first trigger operation, displaying a first page corresponding to the recommended object, where an instant delivery service for the recommended object is provided on the first page.

The present disclosure provides a data interaction apparatus, including:
  a video stream presentation module, configured to present a video stream containing a recommended object and a preset control in a video stream push page of a preset application, where the recommended object supports an instant delivery service;
  a trigger operation receiving module, configured to receive a first trigger operation acting on the preset control;
  a first page presentation module, configured to, in response to the first trigger operation, display a first page corresponding to the recommended object, where an instant delivery service for the recommended object is provided on the first page.

The present disclosure provides a computer-readable storage medium on which a computer program is stored, the computer program, when executed by a processor, causes implementation of the above-mentioned data interaction method.

The present disclosure provides an electronic device, including a memory, a processor, and a computer program stored in the memory and executable on the processor, the processor can execute the computer program to cause implementation of the above-mentioned data interaction method.

DETAILED DESCRIPTION OF PREFERRED EMBODIMENTS

Figure 1:
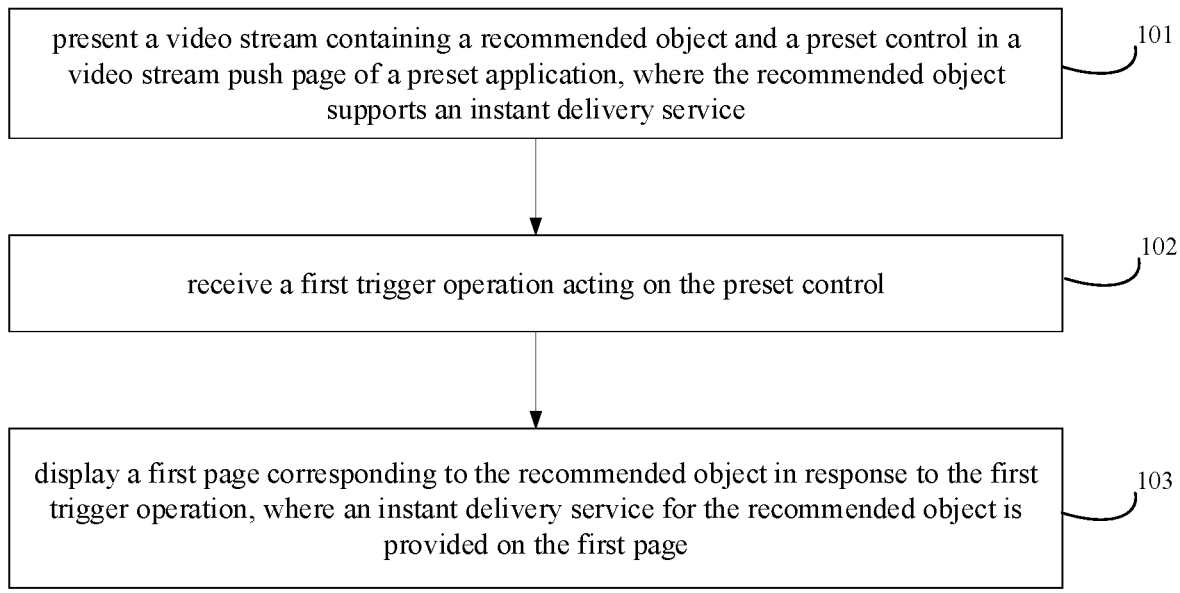
FIG. 1 is a schematic flowchart of a data interaction method according to an embodiment of the present disclosure.

Embodiments of the present disclosure will be described below with reference to the accompanying drawings. Although some embodiments of the disclosure are shown in the drawings, the disclosure may be embodied in various forms and these embodiments are provided for the understanding of the disclosure. The drawings and embodiments of the present disclosure are for illustrative purposes only.

Multiple steps described in the method embodiments of the present disclosure may be executed in different orders and/or in parallel. Furthermore, method embodiments may include additional steps and/or omit performance of illustrated steps. The scope of the present disclosure is not limited in this regard.

As used herein, the term "comprise" and its variations are open-ended, i.e., "comprising but not limited to". The term "based on" means "based at least in part on". The term "one embodiment" means "at least one embodiment"; the term "another embodiment" means "at least one additional embodiment"; and the term "some embodiments" means "at least some embodiments". Relevant definitions of other terms will be given in the description below.

Concepts such as "first" and "second" mentioned in this disclosure are only used to distinguish different apparatuses, modules or units, instead of being used to limit the order or interdependence of the functions performed by these apparatuses, modules or units.

The modifications of "one" and "multiple" mentioned in this disclosure are illustrative and not restrictive. Those skilled in the art will understand that unless the context indicates otherwise, it should be understood as "one or more".

The names of messages or information interacted between multiple apparatuses in the embodiments of the present disclosure are for illustrative purposes only, instead of being used to limit the scope of these messages or information.

In the following embodiments, optional features and examples are provided in each embodiment. Multiple features as recited in the embodiments can be combined to form multiple optional solutions, each numbered embodiment should not be regarded as only one technical solution.

The video stream contains various types of contents, one of which is to push recommended objects to users who view the video stream, the recommended objects here may include, for example, tangible goods or specific services provided by a merchant or store. When users see recommended objects they are interested in, they can view relevant information about the recommended object, such as detailed graphic and text introductions and related activity information, through entering operations on the current video stream display page. However, the above interaction forms are relatively simple, resulting in lack of application functions and poor user experience, which needs improvement.

In view of this, the present disclosure proposes improved data interaction solutions, which will be described in conjunction with embodiments and drawings hereinafter.

FIG. 1 is a schematic flowchart of a data interaction method provided by an embodiment of the present disclosure. The method can be executed by a data interaction apparatus, where the apparatus can be implemented by software and/or hardware, and can generally be integrated in an electronic device. The electronic device may be a mobile device such as a mobile phone, a smart watch, a tablet computer, or a personal digital assistant, etc.; it may also be a desktop computer or other device.

As shown in FIG. 1, the method may include:

Step 101: present a video stream containing a recommended object and a preset control in a video stream push page of a preset application, where the recommended object supports an instant delivery service.

In the embodiment of the present disclosure, the type of the preset application is not limited, for example, the preset application may be a short video application or a live application, or other types of applications. The preset application has a video stream push function, and the video stream may include a live video stream or a short video stream, etc., and the source and push mechanism of the video stream can be set by the preset application according to actual needs. Generally, the video stream can be published by a user who logs in the preset application, or by a platform corresponding to the preset application.

For example, the recommended object may include goods or services, etc., for example, the recommended object may be tangible goods or specific services provided by a merchant or store, and the merchant or store may be referred to as a provider for the recommended object. Among them, goods can include food, flowers, medicines, cosmetics or daily necessities, etc.; services can include cleaning services, maintenance services or installation services, etc. In order to facilitate understanding, part of the following contents will be schematically explained by taking the recommended object being goods and the provider being the store as an example. The video contents in the video stream may include information relevant to the recommended object, and the relevant information may include voice explanations, graphic explanations, or video explanations, etc. for the recommended object. For example, the video stream is a live video stream, the recommended object is a burger sold by a merchant, and the live video stream can include real-time picture of the anchor foretasting the burger and the anchor's explanation of the burger, etc.; as another example, the video stream is a short video stream, the recommended object is a lipstick produced by a merchant, and the short video can include a video of the short video author trying out the lipstick and the short video author's explanation for the lipstick, etc.

In an embodiment of the present disclosure, the preset control can be referred to as a control used to trigger the display of a first page described later, the embodiment does not limit the existence form, display position and so on of the preset control. Generally, the video stream push page can contain some controls for a user to input interactive operations, an original control can be reused as the preset control, or a preset control can be newly added based on the original control.

Step 102: receive a first trigger operation acting on the preset control.

In an embodiment of the present disclosure, the form of the first trigger operation is not limited, for example, the first trigger operation may be click, double click, long press, or slide. The electronic device can receive the first trigger operation according to the input manner corresponding to the first trigger operation, identify the first trigger operation, and confirm that the first trigger operation acts on the preset control.

Step 103: display a first page corresponding to the recommended object in response to the first trigger operation, where an instant delivery service for the recommended object is provided on the first page.

For example, the instant delivery service can be construed as a service that delivers a recommended object to a user within a short period of time in response to a service request from the user, and can also be construed as a takeaway service, the takeaway here can be interpreted in a broad sense, and provision of goods and services in the way of going out can be interpreted as takeaway. The above-mentioned short period of time may include immediate delivery or delivery within the scheduled time. If the provider corresponding to the recommended object supports scheduled delivery, for example, it can support scheduled delivery within one day or several days in the future, it can provide delivery services in the scheduled time specified by the user to meet the user's needs more flexibly. Taking the live scenario as an example, a user can adopt a manner of ordering immediately and scheduling delivery to lock in the preferential price of the recommended object, and accept the delivery service of the recommended object at its own convenience. The instant delivery service may be provided by the provider of the recommended object, or may be provided by a platform corresponding to a preset application, which is not limited in this embodiment. For a case where the recommended object is a tangible goods, the merchant can be responsible for delivering the goods to the user, or the platform corresponding to the preset application can be responsible for picking up the goods from the merchant and then delivering the goods to the user; for a case that the recommended objects a specific service, the merchant can assign a dedicated person to go out to the user's location to provide the user with the corresponding service.

In an embodiment of the present disclosure, the first page may be a native page of the preset application or may be a page of an applet associated with the preset application. The embodiment does not limit the page form of the first page. After it is determined that a first trigger operation acting on the preset control is received, the first trigger operation may be responded to, and the response manner may include displaying the first page corresponding to the recommended object. On the first page, an instant delivery service for the recommended objects may be provided, and the embodiment does not limit the contents displayed on the first page. Exemplarily, the first page may include an instant delivery service request entry corresponding to the recommended object. The user can request, e.g., order, the instant delivery service through the request entry, and can also perform other related operations for the instant delivery service, such as setting delivery address, selecting payment manner, paying for the order, or the like, and after placing the order, it can be performed that checking the order state, viewing order information, canceling the order, applying for refund, and contacting the provider, etc. Exemplarily, the first page may also include an instant delivery service page from the provider corresponding to the recommended object, the instant delivery service page may include instant delivery service request entries corresponding to various recommended objects provided by the provider that include the recommended object in the video stream, for example, a user can purchase and place an order for goods from the merchant to which the recommended object belongs on the first page.

The data interaction method provided in an embodiment of the present disclosure presents a video stream containing a recommended object and a preset control in a video stream push page of a preset application, receives a first trigger operation acting on the preset control; in response to the first trigger operation, displays a first page corresponding to the recommended object, where an instant delivery service for the recommended object is provided on the first page. By adopting the above technical solution, while the user is watching the video stream containing the recommended object, the user can trigger the preset control to enter a page for providing the instant delivery service for the recommended object, thereby allowing the user to conveniently acquire the favorite recommended object. Compared with the users picking up the goods themselves, the time and cost can be saved for users, interaction forms based on the video stream can be more diverse, interaction effects can be improved and application functions can be enriched. In addition, it can also improve traffic efficiency of the preset application, thereby improving the utilization efficiency of related resources such as corresponding platforms or servers.

In some embodiments, the presenting a video stream containing a recommended object and a preset control in a video stream push page of a preset application may include: in the case where the recommended object supports the instant delivery service, presenting the video stream containing the recommended object and the preset control in the video stream push page of the preset application, and in the case where the recommended object does not support the instant delivery service, presenting the video stream containing the recommended object in the video stream push page of the preset application, that is, the preset control is not presented. The advantage of this configuration is that the instant delivery service is generally limited by some factors, such as whether the video stream publisher has pre-configured the instant delivery function of the recommended object for the video stream, whether the delivery distance is appropriate, and whether the merchant is operating normally, etc., when the recommended object supports the instant delivery service, a preset control can be presented to facilitate the user to obtain a corresponding instant delivery service, while when the recommended object does not support the instant delivery service, the preset control will not be presented to avoid disturbing or misunderstanding the users.

For example, whether the recommended object supports the instant delivery service can be determined in the following manners: if the video stream carries an instant delivery identifier, the delivery distance is within a preset delivery range corresponding to the provider, and the provider is currently in a normal service state, then the recommended object supports the instant delivery service. Among them, the video stream publisher can determine whether to configure the instant delivery function for the included recommended object before publication, if the included recommended object is configured with the instant delivery function, an instant delivery identifier can be added to the video stream to facilitate the preset application to identify. The delivery distance can be calculated based on the user location information and the provider's location information, the user location information can be, for example, positioning information or instant delivery destination information (such as a delivery address), or the like. The service state of the provider can be obtained by interactive confirmation between the service side of the preset application with the provider side, the normal service state can include states such as being in business or accepting reservations.

In some embodiments, the presenting a target video stream containing a recommended object and a preset control in a video stream push page of a preset application may include: in the case where the recommended object supports the instant delivery service, presenting the target video stream containing the recommended object and the preset control in the video stream push page of the preset application, and displaying instant delivery service prompt information at a preset position in the video stream push page. The advantage of this setting is that when the preset control can a control that reuses other functions, the user can be effectively prompted by adding the instant delivery service prompt information, so that the user can quickly find the entry to the first page. The preset position can be the preset position corresponding to the preset control, for example, it can be within a preset range around the preset control, the preset range can be set according to an actual situation such as page layout, for example, it can be set on the right side of the preset control, the instant delivery service prompt information can be displayed in the form of icons and/or text, for example, it can be a text "delivery to home".

In some embodiments, the first page can include an instant delivery service page of the target provider, the target provider is used for providing the recommended object, and the instant delivery service page includes an instant delivery service request entry for the recommended object. Before displaying the first page corresponding to the recommended object, the method can further include: determining a target provider from a set of candidate providers. The advantage of this setting is that for a recommended object, there may be multiple providers that each can provide the instant delivery service for the recommended object. Before entering the first page, the user can select a provider that is more suitable for the current user as a target provider in a certain manner, and enter the instant delivery service page of the target provider, which will help to improve the quality of instant delivery service, reduce the user's manual selection operations, and improve interaction efficiency. This embodiment does not limit the number of target providers, which is generally one, and may also be two or more.

For example, the instant delivery service page may include information of the target provider related to the instant delivery service, such as business address, estimated delivery duration, ratings, preferential information, etc., and the instant delivery service request entry corresponding to the recommended object may display options such as specification, or quantity, and can also include an order button, etc.

For some providers, they may belong to a provider organization, for example, some stores belong to the same brand, which may be a franchise outlet, a head office or a branch office under the same brand, different stores under the same brand generally have different business addresses, a set of candidate providers can include different stores under the same brand. For users, delivery duration is an important indicator for evaluating the quality of instant delivery service, and the delivery duration is generally affected by delivery distance. In some embodiments, the determining a target provider from a set of candidate providers may include: determining a set of candidate providers to which the recommended object belongs; and selecting the target provider from at least two providers included in the set of candidate provides that meets a preset delivery distance requirement and supports the instant delivery service, based on the user's positioning information and/or instant delivery destination information. The advantage of this setting is that the target provider can be quickly and reasonably determined without being limited to a specific provider, which can effectively improve the coverage of the service scope, improve the efficiency of platform traffic, and improve utilization efficiency of platform-related resources.

For example, the set of candidate providers to which the recommended object belongs can be construed as a set of stores under the brand that can provide the recommended object, the set of candidate providers can be preset by the video stream publisher, for example, an identifier for the set of candidate providers can be added for identification by the preset application; alternatively, correspondence relationships between multiple sets of candidate providers and the recommended objects that can be provided can also be maintained in the preset application, and the correspondence relationships can be queried according to the recommended object, and then the corresponding set of candidate providers can be determined. The user's positioning information can be acquired through Global Positioning System (GPS) positioning and other manners under the user's authorization, the instant delivery destination information can be determined based on the user's input or based on the user's historical destination information. The preset delivery distance requirement can be that the distance is closest to the user. For example, a first location can be determined based on the user's positioning information, the business address of each provider included in the set of candidate provider can be labelled as a second location, then the delivery distance between the first location and the second location can be calculated, and a provider with the shortest delivery distance and supporting the instant delivery service can be selected as the target provider. For instant delivery destination information, the calculation method is similar, for example, a third location can be determined based on the user's instant delivery destination information, the business address of each provider included in the set of candidate provider can be labelled as the second location, then the delivery distance between the third location and the second location can be calculated, and a provider with the shortest delivery distance and supporting the instant delivery service can be selected as the target provider. When the user's positioning information and instant delivery destination information exist at the same time, it can obtain one (the results of the two calculation manners are consistent) or two target providers according to the above calculation method.

In some embodiments, the instant delivery service page also includes an instant delivery service application entry corresponding to a set recommendation object provided by the target provider. The advantage of this setting is that when the user is watching the video stream, the user may be interested in the provider corresponding to the recommended object, and there may exist a need to know other recommended objects that the provider can provide, the instant delivery service page containing the instant delivery service request entries corresponding to the other objects is helpful for the user to quickly place orders for other recommended objects provided by the same provider, instead of being limited to only the recommended objects that appear in the video stream. The recommendation effect can be enhanced and users' more diverse order need can be satisfied.

In some embodiments, the first page may include a main service page of the provider of the recommended object, the main service page includes an entry to a second page, and the second page includes an instant delivery service page of the provider of the recommended object. Among them, the main service page can be construed as an aggregation page of multiple services that the provider can provide, including the entry to the instant delivery service page, and may also include an entry to a preset service page, the preset service may be, for example, a group purchase service or an express delivery service, etc., which are not limited in this embodiment. The advantage of this setting is that entering the provider's main service page first can help the user to gain a more comprehensive understanding of the provider's relevant information and the provided services. Generally, the video stream publisher may set the provider corresponding to the recommended object before publication, and in such a case, the provider corresponding to the first page may be consistent with the provider set by the publisher.

In some embodiments, a preset number of alternative recommended objects provided by the provider of the recommended object can be displayed at the entry to the second page. The advantage of this setting is to help the user to quickly browse the main recommended objects provided by the provider. Among them, the preset number can be determined according to relevant factors such as page layout, such as 3. The alternative recommended objects can be determined based on the ranking of all recommended objects provided by the provider which is based on a factor, such as sales volume or positive rating, and a preset number of recommended objects with higher rankings can be used as alternative recommended objects. Among them, the alternative recommended objects may include the recommended object in the video stream.

In some embodiments, after displaying a first page corresponding to the recommended object, the method may further include: receiving a second trigger operation acting on the target alternative recommended object; and in response to the second trigger operation, displaying the second page, wherein in the second page, an instant delivery service request entry for the target alternative recommended object can be displayed in a first preset display manner, and the instant delivery service application entry corresponding to a preset recommended object can be displayed in a second preset display manner, the preset recommended object may include a recommended object in the second page other than the target alternative recommended object. The first preset display manner is different from the second preset display manner. Generally, when a user is viewing multiple alternative recommended objects, if the user is interested in one alternative recommended object, the user is likely to select the alternative recommended object for learning or placing an order, therefore, after entering the second page, the target alternative recommended object can be displayed differentiatedly to facilitate the user to quickly locate the alternative recommended object just selected. Differentiated display can be interpreted as a display manner different from that for the remaining recommended objects on the second page. For example, the first preset display manner can be to display the target alternative recommended objects pinnedly, and can also add a prompt information such as "Just watched", can also use a background color that is different from the second preset display manner, etc. The second trigger operation may be, for example, a click operation, which is not limited in this embodiment.

In some embodiments, before displaying the second page, the method may further include: determining a target provider from a set of candidate providers; wherein when displaying the second page, the method may further include: when it is detected that the provider corresponding to the second page is inconsistent with the target provider, displaying inquiry information for switching to an instant delivery service page corresponding to the target provider. When the second page is displayed for the first time, the provider corresponding to the second page can be the same as the provider in the first page, however, for the user, the current provider may not be suitable for providing instant delivery services to the current user, therefore, the preset application automatically matches a more suitable target provider, allowing users to quickly switch.

In some embodiments, before displaying the second page, the method may further include: determining a target provider from a set of candidate providers; wherein estimated delivery duration information corresponding to the target provider is displayed at the entry to the second page. The advantage of this setting is that, as mentioned above, delivery duration is an important indicator for evaluating the quality of the instant delivery service, and is also an important factor based on which the user considers whether to place an order, the estimated delivery duration information can be displayed in advance at the entry to the second page, the user can decide whether to proceed to the next operation based on his/her acceptance level, which can improve interaction efficiency, avoid wasting user's time, and improve user's experience.

In some embodiments, the recommended object corresponds to at least one associated provider, and the associated provider is used to provide recommended objects belonging to the same category as the recommended object; the first page includes an aggregation service page for the provider of the recommended object and the associated providers, the aggregation service page includes entries to the instant delivery service pages corresponding to the provider of the recommended object and the associated providers respectively. The advantage of this setting is that more merchants that can provide similar goods can be displayed, making it easier for the user to make choice according to personal preferences and the recommendation effect can be improved. Among them, the associated provider can be set by the video stream publisher or can be matched by the server side of the preset application. In the aggregation service page, the entry to the instant delivery service page of the provider can be displayed differentiatedly, that is, the display manner of the entry to the instant delivery service page of the provider is different from that of the entry to the instant delivery service page of the associated provider. In an embodiment, the delivery distance corresponding to the associated provider is within a preset distance range.

Exemplarily, the recommended object is Spicy Crayfish in store A, and there are stores B and C near the user that can also provide Spicy Crayfish, therefore, the preset application can determine store B and store C as associated providers, the entries to the instant delivery service pages corresponding to store A, store B and store C respectively are displayed in the first page, and the entry to the instant delivery service page of store A is displayed in a differentiated manner such as being pinned or highlighted.

Figure 2:
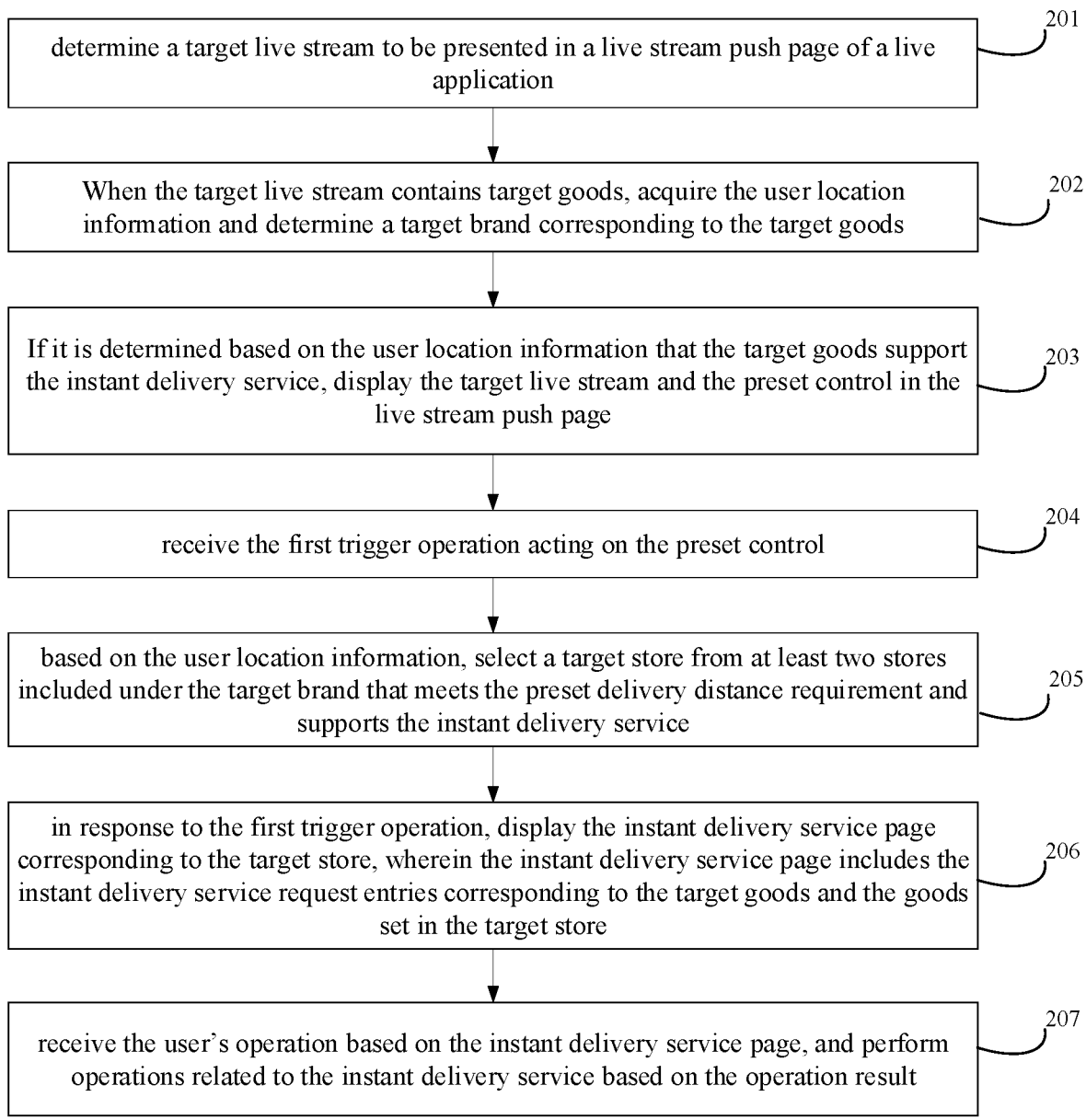
FIG. 2 is a schematic flowchart of another data interaction method according to an embodiment of the present disclosure.

FIG. 2 is a schematic flowchart of another data interaction method provided by an embodiment of the present disclosure, the embodiment of the present disclosure will be explained based on the solution in the above embodiment, taking a video live scene as an example, the method includes the following steps:

Step 201: determine a target live stream to be presented in a live stream push page of a live application.

For example, when it is necessary to switch live rooms, a target live room can be determined according to a push algorithm for the live stream, and then the target live stream to be played in the target live room can be determined; for the same live room, the goods that the anchor will explain immediately can be determined according to the operation on the author side, and then the corresponding target live stream can be determined.

Step 202: When the target live stream contains target goods, acquire the user location information and determine a target brand corresponding to the target goods.

For example, the target goods can be a dish, before starting the live, the anchor can pre-set a store under the takeaway brand to which the target product explained in the live stream belongs. For example, a store page of a store under the takeway brand can be attached to the live room by attaching a takeaway applet.

Step 203: If it is determined based on the user location information that the target goods support the instant delivery service, display the target live stream and the preset control in the live stream push page.

For example, it can be determined whether there is a merchant that can deliver to the user's location among the multiple merchants under the takeaway brand set above. If there is a merchant that can deliver to the user's location, it can be considered that the target goods support the instant delivery service, and the preset control can be presented while the target live stream is being presented.

Figure 3:
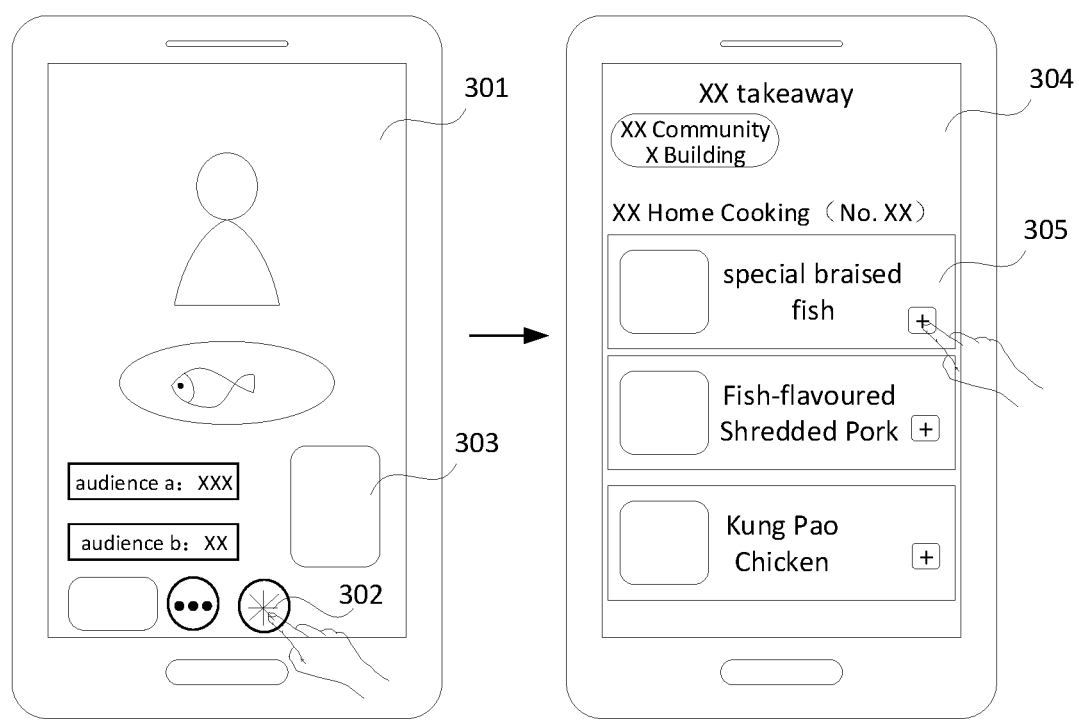
FIG. 3 is a schematic page diagram of an interactive process according to an embodiment of the present disclosure.

For example, the preset control can be an icon with a set style, such as a snowflake style, or an explanation card corresponding to the target goods, etc., and the preset control can be the anchor point of the attached takeaway applet. FIG. 3 is a schematic page diagram of an interactive process provided by an embodiment of the present disclosure. As shown in FIG. 3, in the live stream push page 301, the anchor is explaining a dish of special braised fish, and a first preset control 302 and a second preset control 303 can be displayed, the second preset control 303 can be an explanation card of the special braised fish, and the user can jump to the instant delivery service page by triggering any one of the first preset control 302 and the second preset control 303.

Step 204: receive the first trigger operation acting on the preset control.

Step 205: based on the user location information, select a target store from at least two stores included under the target brand that meets the preset delivery distance requirement and supports the instant delivery service.

The user location information may include the user's positioning information and/or instant delivery destination information.

For example, a store that is closest to the user's location and supports the instant delivery service can be selected as the target store.

Step 206: in response to the first trigger operation, display the instant delivery service page corresponding to the target store, wherein the instant delivery service page includes the instant delivery service request entries corresponding to the target goods and the goods set in the target store.

As shown in FIG. 3, when the user clicks on the first preset control 302, the user can enter the takeaway service page 304 of the target store, where the page includes the takeaway service request entry 305 for the special braised fish in the live video stream, and also includes takeaway service entries for other dishes in the target store, and the user can make choice according to own preferences.

The instant delivery service page corresponding to the target store may also support operations such as switching stores, etc., which is not limited in this embodiment.

Step 207: receive the user's operation based on the instant delivery service page, and perform operations related to the instant delivery service based on the operation result.

For example, after the user places the order, the relevant order information can be pushed to the target store, and the target store can product the relevant dishes, etc., to provide the user with dish delivery services. In addition, the user can also perform related operations, such as viewing order information, contacting stores, contacting delivery people and so on, in the live application.

The data interaction method provided by the embodiments of the present disclosure can be applied to the video live scenario, during the live stream of the anchor explaining the goods is played in the live stream push page, for goods that support the takeaway service, a preset control of entering the takeaway service can be displayed to the user, after the preset control is triggered, the user can be automatically shown a takeaway service page of the store under the same brand that is closest to the user, making it convenient for the user to purchase the goods recommended by the anchor and other favorite goods in the store, without having to go to the store, it provides the user with a consumption choice that is more timely and has lower fulfillment costs, enhances user stickiness, increases anchor's enthusiasm for broadcasting, and the interaction based on live streaming can be more efficient and convenient.

Based on the above embodiments, the live stream can also be replaced by a short video stream, and a corresponding preset controls can be designed according to the characteristics of the short video push page, the preset control can also be the anchor point of the attached takeaway applet, other interaction logic and page design can be similar and will not be described again here.

Figure 4:
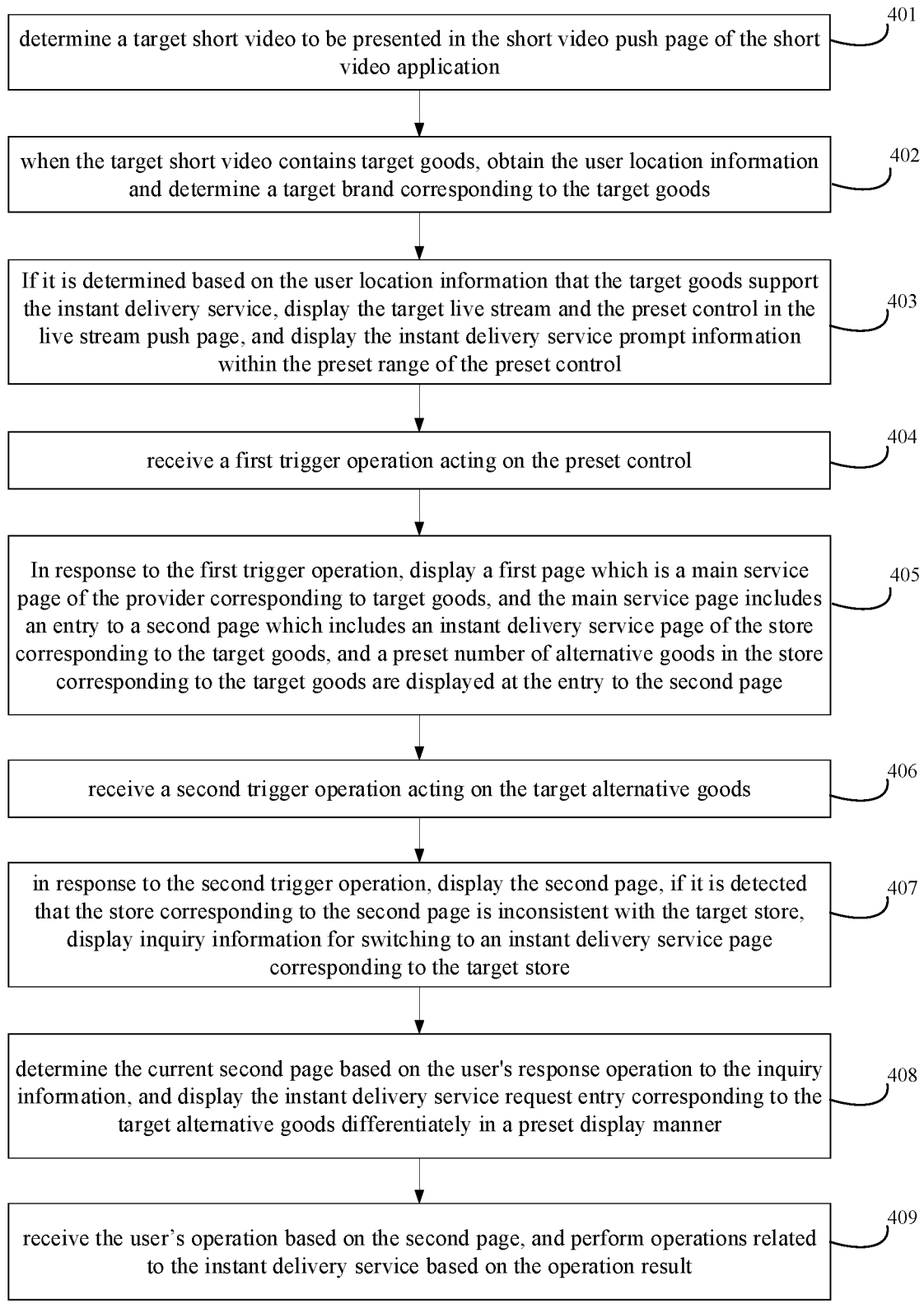
FIG. 4 is a schematic flowchart of still another data interaction method according to an embodiment of the present disclosure.

FIG. 4 is a schematic flowchart of another data interaction method provided by an embodiment of the present disclosure. The embodiment of the present disclosure is explained based on the solution in the above embodiments, taking a short video recommendation scenario as an example, the method includes the following steps:

Step 401: determine a target short video to be presented in the short video push page of the short video application.

For example, for a short video recommendation scenario where video authors need to be switched, the target short video can be determined according to a short video recommendation algorithm; for a situation where the user actively selects the short video to be played, if the user selects a short video work in the personal homepage of a video author, the target short video can be determined based on the user's choice.

Step 402: when the target short video contains target goods, obtain the user location information and determine a target brand corresponding to the target goods.

Still taking dishes as an example, before publishing a short video, the video author can pre-set a store under the takeaway brand to which the target goods in the short video, that is recommended to other users, belongs. For example, a Point of Interest (POI) anchor point of a store under the takeaway brand can be attached to the short video. In related technologies, the POI anchor point can serve as an entry to a store's preset services, such as group purchase services. In the embodiment of the present disclosure, the POI anchor point can be reused and serve as a preset control.

Step 403: If it is determined based on the user location information that the target goods support the instant delivery service, display the target live stream and the preset control in the live stream push page, and display the instant delivery service prompt information within the preset range of the preset control.

For example, the preset control is presented while the target short video is being played. In addition, it can be determined whether there is a merchant that can deliver to the user's location among the multiple merchants under the takeaway brand set above, if there is a merchant that can deliver to the user's location, it can be considered that the target goods support the instant delivery service, and the instant delivery service prompt information can be displayed within a preset range of the preset control.

Figure 5:
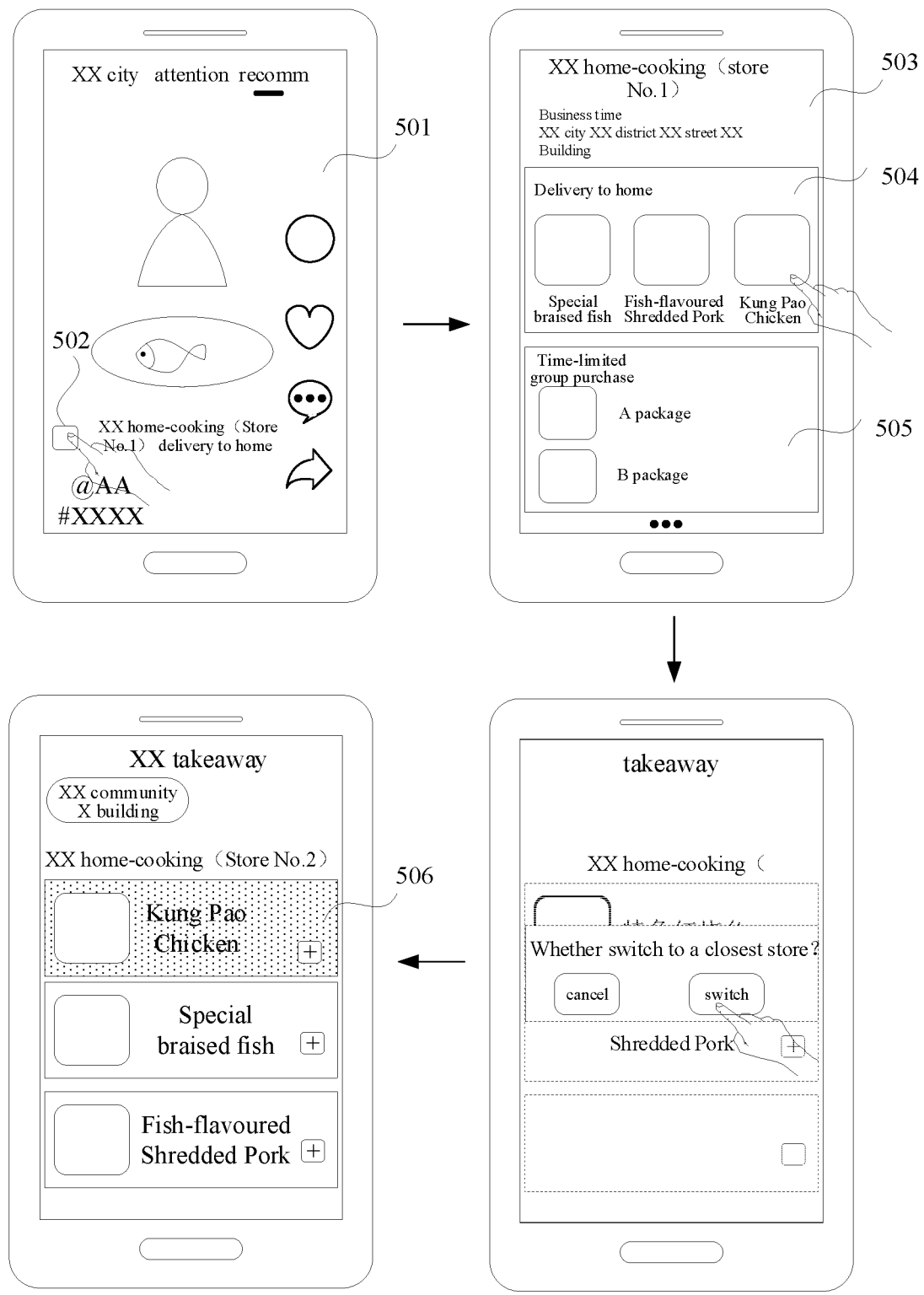
FIG. 5 is a schematic page diagram of another interactive process according to an embodiment of the present disclosure.

FIG. 5 is a schematic page diagram of another interactive process provided by an embodiment of the present disclosure. As shown in FIG. 5, the short video contents in the short video push page 501 can be the video author's explanation of the special braised fish, and the preset control 502 can be displayed, and an instant delivery service prompt information with a text "delivery to home" can be displayed on the right side of the preset control 502. The user can jump to the main service page by triggering the preset control 502.

Step 404: receive a first trigger operation acting on the preset control.

Step 405: In response to the first trigger operation, display the first page, which is a main service page of the provider corresponding to the target goods, and the main service page includes an entry to a second page, which includes an instant delivery service page of the store corresponding to the target goods, and a preset number of alternative goods in the store corresponding to the target goods are displayed at the entry to the second page.

As shown in FIG. 5, after the user clicks on the POI anchor point, the user can enter the main service page 503 of the store corresponding to the POI anchor point, the main service page 503 includes the entry 504 to the second page and the entry 505 to the third page, the second page includes the instant delivery service page of the store corresponding to the target goods, and the third page includes a preset service page of the store corresponding to the target goods, and the preset service may be a group purchase service, for example. At the entry 504 to the second page, a preset number of alternative goods in the store corresponding to the target goods can be displayed, which, for example, may be the store's hot-selling dishes. The three hot-selling dishes shown in the figure are used as alternative goods.

Step 406: receive a second trigger operation acting on the target alternative goods.

Additionally or alternatively, based on the user location information, a target store can be selected from at least two stores included under the target brand that meets the preset delivery distance requirement and supports the instant delivery service.

The user location information may include the user's positioning information and/or instant delivery destination information.

For example, a store that is closest to the user's location and supports the instant delivery service can be selected as the target store.

Step 407: in response to the second trigger operation, display the second page. If it is detected that the store corresponding to the second page is inconsistent with the target store, display inquiry information for switching to an instant delivery service page corresponding to the target store.

For example, the store in the second page that is initially displayed is consistent with the store in the first page, both are "Store No. 1", as shown in FIG. 5, and the determined target store closest to the user is "Store No. 2", therefore, it can ask the user whether needs to switch.

Step 408: determine the current second page based on the user's response operation to the inquiry information, and display the instant delivery service request entry corresponding to the target alternative goods differentiately in a preset display manner.

For example, if the user confirms the switch, the user can switch to the second page corresponding to the target store. If the user cancels the switch, the display of the existing second page can be kept. As shown in FIG. 5, the user can respond by clicking the switch button, and then switch to the second page of "Store No. 2".

As shown in FIG. 5, because the user selected Kung Pao Chicken in the first page, the target alternative goods is Kung Pao Chicken, and the instant delivery service request entry 506 corresponding to the target alternative goods is displayed differentiately in a preset display manner, the preset display manner can be display pinnedly and the entry background color can be changed.

Step 409: receive the user's operation based on the second page, and perform operations related to the instant delivery service based on the operation result.

The data interaction method provided by the embodiments of the present disclosure can be applied to the short video push scenario, during the video stream of the video author explaining the goods is played in the short video push page, for goods that support the takeaway service, a preset control of entering a main service page for a plurality of services including the takeaway service can be displayed to the user, after the preset control is triggered, the user can enter the main service page and can be provided with a takeaway service entry, which can present hot-selling goods, after the user selects a hot-selling goods, the user can be automatically shown a takeaway service page of the store under the same brand that is closest to the user, making it convenient for the user to purchase the goods recommended by the video author and other favorite goods in the store, it provides the user with a consumption choice that is more timely and has lower fulfillment costs, enhances user stickiness, increases anchor's enthusiasm for publishing the short video, and the interaction based on short video can be more efficient and convenient.

Figure 6:
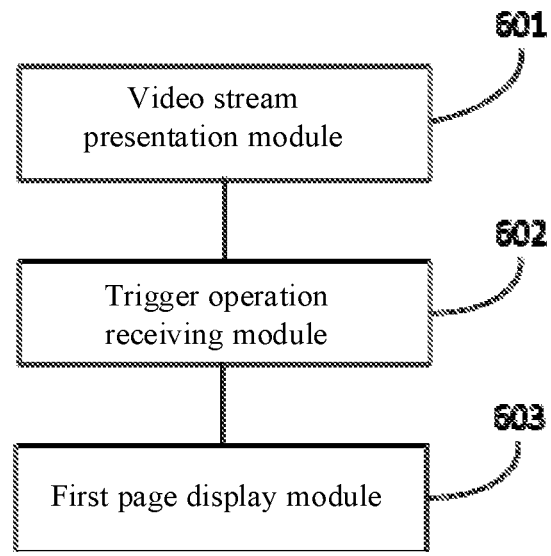
FIG. 6 is a structural block diagram of a data interaction apparatus according to an embodiment of the present disclosure.

FIG. 6 is a structural block diagram of a data interaction apparatus provided by an embodiment of the present disclosure, the apparatus can be implemented by software and/or hardware, generally can be integrated in an electronic device and can perform data interaction by executing a data interaction method. As shown in FIG. 6, the apparatus can include:

a video stream presentation module 601, configured to present a video stream containing a recommended object and a preset control in a video stream push page of a preset application, where the recommended object supports an instant delivery service; a trigger operation receiving module 602, configured to receive a first trigger operation acting on the preset control; and a first page presentation module 603, configured to, in response to the first trigger operation, display a first page corresponding to the recommended object, where an instant delivery service for the recommended object is provided on the first page.

Through the data interaction apparatus provided in an embodiment of the present disclosure, while the user is watching the video stream containing the recommended object, the user can trigger the preset control to enter a page for providing the instant delivery service for the recommended object, thereby allowing the user to conveniently acquire the favorite recommended object, data interaction forms can be more diverse, interaction effects can be improved and application functions can be enriched. In addition, it can also improve traffic efficiency of the preset application, thereby improving the utilization efficiency of related resources such as corresponding platforms or servers.

In an embodiment, the video stream presentation module can be configured to: in a case where the recommended object supports the instant delivery service, present the video stream containing the recommended object and the preset control in the video stream push page of the preset application; or, in the case where the recommended object supports the instant delivery service, present the target video stream containing the recommended object and the preset control in the video stream push page of the preset application, and display instant delivery service prompt information at a preset position in the video stream push page.

In an embodiment, the first page can include an instant delivery service page of the target provider, the target provider is used for providing the recommended object, and the instant delivery service page includes an instant delivery service request entry for the recommended object; the apparatus can further include a first target provider determination module configured to, before the first page corresponding to the recommended object is displayed, determine a target provider from a set of candidate providers.

In an embodiment, the first target provider determination module is configured to: determine a set of candidate providers to which the recommended object belongs; and select the target provider from at least two providers included in the set of candidate provides that meets a preset delivery distance requirement and supports the instant delivery service, based on the user's positioning information and/or instant delivery destination information.

In an embodiment, the instant delivery service page also includes an instant delivery service application entry corresponding to a set recommended object provided by the target provider.

In an embodiment, the first page includes a main service page of the provider of the recommended object, the main service page includes an entry to a second page, and the second page includes the instant delivery service page of the provider of the recommended object.

In an embodiment, a preset number of alternative recommended objects provided by the provider of the recommended object can be displayed at the entry to the second page.

In an embodiment, the apparatus may further include:
a second trigger operation receiving module configured to, after the first page corresponding to the recommended object is displayed, receive a second trigger operation acting on the target alternative recommended object; wherein the above mentioned second trigger operation receiving module 602 can be also referred to a first trigger operation receiving module; the first page display module is configured to, in response to the second trigger operation, display the second page, wherein in the second page, an instant delivery service request entry for the target alternative recommended object can be displayed in a first preset display manner, and the instant delivery service application entry corresponding to a preset recommended object can be displayed in a second preset display manner, the preset recommended object may include a recommended object in the second page other than the target alternative recommended object, and the first and second preset display manners are different.

In an embodiment, the apparatus may further include: a second target provider determination module configured to, before the second page is displayed, determine a target provider from a set of candidate providers; an inquiry information display module configured to, when the second page is displayed, in a case it is detected that the provider corresponding to the second page is inconsistent with the target provider, display inquiry information for switching to an instant delivery service page corresponding to the target provider.

In an embodiment, the recommended object corresponds to at least one associated provider, and the associated provider is used to provide recommended objects belonging to the same category as the recommended object; the first page includes an aggregation service page for the provider of the recommended object and the associated providers, the aggregation service page includes entries to the instant delivery service pages corresponding to the provider of the recommended object and the associated providers respectively.

Figure 7:
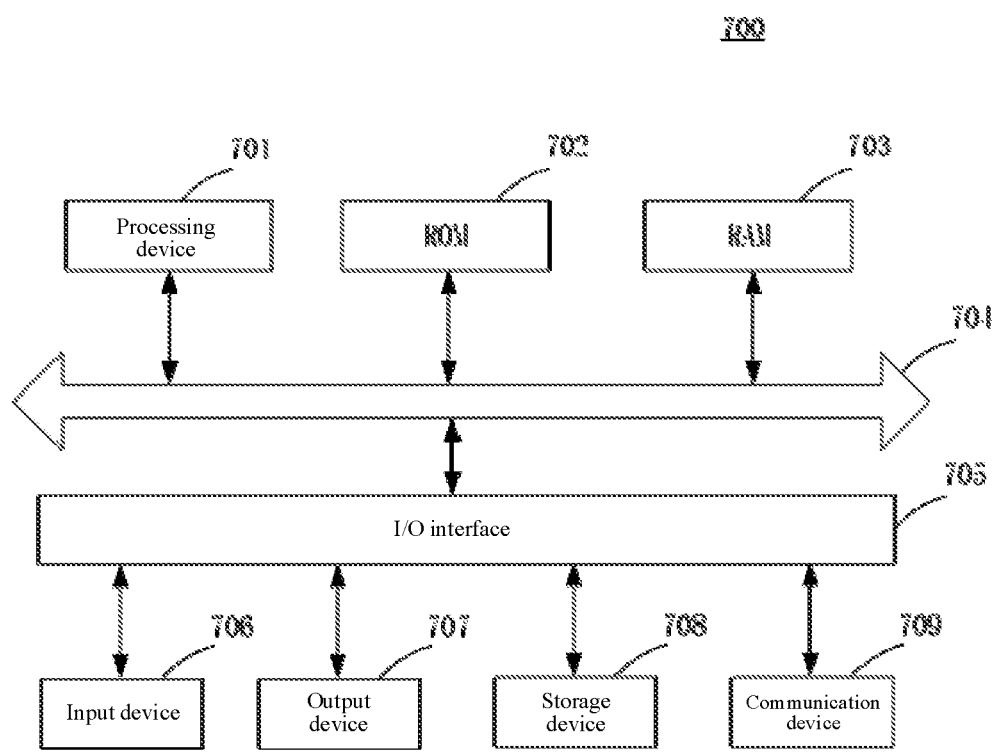
FIG. 7 is a structural block diagram of an electronic device according to an embodiment of the present disclosure.

Reference is now made to FIG. 7 which is a schematic structural diagram of an electronic device 700 suitable for implementing embodiments of the present disclosure. The electronic device 700 in the embodiments of the present disclosure may include, but not limited to, mobile terminals such as mobile phones, notebook computers, digital broadcast receivers, Personal Digital Assistants (PDAs), tablet computers (PAD), Portable Media Player (PMP), vehicle-mounted terminals (such as vehicle-mounted navigation terminals), and fixed terminals such as digital televisions (TV), desktop computers, and the like. The electronic device 700 shown in FIG. 7 is only an example and should not bring any limitation to the functions and usage scopes of the embodiments of the present disclosure.

As shown in FIG. 7, the electronic device 700 may include a processing device (such as a central processing unit, a graphics processor, etc.) 701, which may be configured according to a program stored in a Read-Only Memory (ROM) 702 or a program stored in a Random Access Memory (RAM) 703 from a storage device 708, to perform various appropriate actions and processes. In RAM 703, various programs and data required for the operation of the electronic device 700 are also stored. The processing device 701, the ROM 702 and the RAM 703 are connected to each other via a bus 704. An input/output (I/O) interface 705 is also connected to bus 704.

Generally, the following devices can be connected to the I/O interface 705: an input devices 706 including, for example, a touch screen, touch pad, keyboard, mouse, camera, microphone, accelerometer, gyroscope, etc.; an output device 707 including, for example, a Liquid Crystal Display (LCD), a speaker, a vibrator, etc.; a storage device 708 including a magnetic tape, a hard disk, etc.; and a communication device 709. The communication device 709 may allow the electronic device 700 to communicate wirelessly or wiredly with other devices to interact data. Although FIG. 7 illustrates the electronic device 700 configured with various means, implementation or availability of all illustrated means is not required, and more or fewer devices may alternatively be implemented or provided.

According to embodiments of the present disclosure, the processes described above with reference to the flowcharts may be implemented as a computer software program. For example, embodiments of the present disclosure include a computer program product including a computer program carried on a non-transitory computer-readable medium, the computer program containing program code for performing the method illustrated in the flowcharts. In such embodiments, the computer program may be downloaded and installed from the network via the communication device 709, or installed from the storage device 708, or installed from ROM 702. When the computer program is executed by the processing device 701, the above-mentioned functions defined in the method of the embodiments of the present disclosure can be performed.

The computer-readable medium mentioned above in the present disclosure may be a computer-readable signal medium or a computer-readable storage medium, or any combination of both. The computer-readable storage medium may be, for example, but not limited to, an electrical, magnetic, optical, electromagnetic, infrared, or semiconductor system, apparatus or device, or any combination thereof. Examples of computer-readable storage media may include, but not limited to: electrical connections having one or more wires, portable computer disks, hard drives, RAM, ROM, Erasable Programmable Read-Only Memory (EPROM) or flash memory, optical fiber, portable Compact Disc Read-Only Memory (CD-ROM), optical storage device, magnetic storage device, or any suitable combination of the above. In this disclosure, a computer-readable storage medium may be any tangible medium that contains or stores a program for use by or in connection with an instruction execution system, apparatus, or device. In the present disclosure, a computer-readable signal medium may include a data signal propagated in baseband or as part of a carrier wave, carrying computer-readable program codes therein. Such propagated data signals may take many forms, including but not limited to electromagnetic signals, optical signals, or any suitable combination of the above. A computer-readable signal medium may also be any computer-readable medium other than a computer-readable storage medium that can send, propagate, or transmit a program for use by or in connection with an instruction execution system, apparatus, or device. Program codes contained on a computer-readable medium can be transmitted using any appropriate medium, including but not limited to, wires, optical cables, Radio Frequency (RF), etc., or any suitable combination of the above.

The above-mentioned computer-readable medium may be included in the above-mentioned electronic device; it may also exist alone without being assembled into the electronic device.

The computer-readable medium carries one or more programs. When the one or more programs are executed by the electronic device, the electronic device is caused to present a video stream containing a recommended object and a preset control in a video stream push page of a preset application; receive a first trigger operation acting on the preset control; and in response to the first trigger operation, display a first page corresponding to the recommended object, where an instant delivery service for the recommended object is provided on the first page.

Computer program codes for performing the operations of the present disclosure may be written in one or more programming languages, including but not limited to object-oriented programming languages—such as Java, Smalltalk, C++, and conventional procedural programming languages—such as "C" or similar programming languages. The program codes may be executed entirely on the user's computer, partly on the user's computer, as a stand-alone software package, partly on the user's computer and partly on a remote computer, or entirely on the remote computer or server. In situations involving remote computer, the remote computer can be connected to the user's computer through any kind of network, including a Local Area Network (LAN) or a Wide Area Network (WAN), or it can be connected to an external computer (for example, using an Internet service provider to connect via the Internet).

The flowcharts and block diagrams in the drawings illustrate the architecture, functionality, and operations of possible implementations of systems, methods, and computer program products according to various embodiments of the present disclosure. In this regard, each block in the flowchart or block diagram may represent a module, program segment, or portion of code that contains one or more executable instructions for implementing the specified logic functions. It should also be noted that, in some alternative implementations, the functions noted in the block may occur in an order other than the order noted in the figures. For example, two blocks shown one after another may actually execute substantially in parallel, or they may sometimes execute in the reverse order, depending on the functionality involved. It will also be noted that each block of the block diagram and/or flowchart illustration, and combinations of blocks in the block diagram and/or flowchart illustration, can be implemented by a dedicated hardware-based system that performs the specified functions or operations, or can be implemented using a combination of dedicated hardware and computer instructions.

The modules involved in the embodiments of the present disclosure can be implemented in software or hardware. Among them, the name of the module does not constitute a limitation on the module itself. For example, the trigger operation receiving module can also be described as "a module that receives the first trigger operation acting on the preset control."

The functions described above herein may be performed, at least in part, by one or more hardware logic components. For example, without limitation, exemplary types of hardware logic components that can be used may include Field Programmable Gate Array (FPGA), Application Specific Integrated Circuit (ASIC), Application Specific Standard Parts (ASSP), System on Chip (SOC), Complex Programmable Logic Device (CPLD), etc.

In the context of this disclosure, a machine-readable medium may be a tangible medium that may contain or store a program for use by or in connection with an instruction execution system, apparatus, or device. The machine-readable medium may be a machine-readable signal medium or a machine-readable storage medium. Machine-readable medium may include, but not limited to, electronic, magnetic, optical, electromagnetic, infrared, or semiconductor systems, apparatuses or devices, or any suitable combination of the foregoing. Examples of machine-readable storage medium would include an electrical connection based on one or more wires, a portable computer disk, a hard drive, RAM, ROM, EPROM or flash memory, optical fiber, CD-ROM, optical storage device, magnetic storage device, or any suitable combination of the above.

According to one or more embodiments of the present disclosure, there is provided a data interaction method, including:

presenting a video stream containing a recommended object and a preset control in a video stream push page of a preset application;

receiving a first trigger operation acting on the preset control; and in response to the first trigger operation, display a first page corresponding to the recommended object, where an instant delivery service for the recommended object is provided on the first page.

In an embodiment, the presenting a video stream containing a recommended object and a preset control in a video stream push page of a preset application, can include:

in a case where the recommended object supports the instant delivery service, presenting the video stream containing the recommended object and the preset control in the video stream push page of the preset application; or, in the case where the recommended object supports the instant delivery service, present the target video stream containing the recommended object and the preset control in the video stream push page of the preset application, and display instant delivery service prompt information at a preset position in the video stream push page.

In an embodiment, the first page can include an instant delivery service page of the target provider, the target provider is used for providing the recommended object, and the instant delivery service page includes an instant delivery service request entry for the recommended object;

wherein, before displaying a first page corresponding to the recommended object, the method can further include:

determining a target provider from a set of candidate providers.

In an embodiment, the determining a target provider from a set of candidate providers may include:

determining a set of candidate providers to which the recommended object belongs; and selecting the target provider from at least two providers included in the set of candidate provides that meets a preset delivery distance requirement and supports the instant delivery service, based on the user's positioning information and/or instant delivery destination information.

In an embodiment, the instant delivery service page also includes an instant delivery service application entry corresponding to a set recommended object provided by the target provider.

In an embodiment, the first page includes a main service page of the provider of the recommended object, the main service page includes an entry to a second page, and the second page includes the instant delivery service page of the provider of the recommended object.

In an embodiment, a preset number of alternative recommended objects provided by the provider of the recommended object can be displayed at the entry to the second page.

In an embodiment, after displaying a first page corresponding to the recommended object, the method may further include:
receiving a second trigger operation acting on the target alternative recommended object;
in response to the second trigger operation, displaying the second page, wherein in the second page, an instant delivery service request entry for the target alternative recommended object can be displayed in a first preset display manner, and the instant delivery service application entry corresponding to a preset recommended object can be displayed in a second preset display manner, the preset recommended object may include a recommended object in the second page other than the target alternative recommended object, and the first and second preset display manners are different.

In an embodiment, before displaying the second page, the method may further include:
determining a target provider from a set of candidate providers;
wherein when the second page is displayed, the method may further include:
in a case it is detected that the provider corresponding to the second page is inconsistent with the target provider, displaying inquiry information for switching to an instant delivery service page corresponding to the target provider.

In an embodiment, the recommended object corresponds to at least one associated provider, and the associated provider is used to provide recommended objects belonging to the same category as the recommended object; the first page includes an aggregation service page for the provider of the recommended object and the associated providers, the aggregation service page includes entries to the instant delivery service pages corresponding to the provider of the recommended object and the associated providers respectively.

According to one or more embodiments of the present disclosure, there is provided a data interaction apparatus, including:
a video stream presentation module, configured to present a video stream containing a recommended object and a preset control in a video stream push page of a preset application, where the recommended object supports an instant delivery service;
a trigger operation receiving module, configured to receive a first trigger operation acting on the preset control; and
a first page presentation module, configured to, in response to the first trigger operation, display a first page corresponding to the recommended object, where an instant delivery service for the recommended object is provided on the first page.

Furthermore, although multiple operations are depicted in a specific order, this should not be understood as requiring that these operations be performed in the specific order shown or performed in a sequential order. Under certain circumstances, multitasking and parallel processing may be advantageous. Likewise, although numerous implementation details are included in the above discussion, these should not be construed as limiting the scope of the present disclosure. Some features that are described in the context of separate embodiments can also be implemented in combination in a single embodiment. Conversely, various features that are described in the context of a single embodiment can also be implemented in multiple embodiments separately or in any suitable sub combination.

What is claimed is:

1. A data interaction method, comprising:
presenting a video stream containing a recommended object in a video stream push page of a preset application;
in a case where the recommended object supports the instant delivery service, presenting an original control for interactive operation to reused as a preset control in the video stream push page of the preset application, and displaying instant delivery service prompt information at a preset position in the video stream push page corresponding to the preset control;
receiving a first trigger operation acting on the preset control; and
in response to the first trigger operation, displaying a first page corresponding to the recommended object, wherein the instant delivery service for the recommended object is provided on the first page,
wherein, in a case where the recommended object does not support the instant delivery service, the presentation of the preset control in the video stream push page of the preset application is omitted.

2. The method of claim 1, wherein, the first page can comprise an instant delivery service page of a target provider, the target provider is used for providing the recommended object, and the instant delivery service page comprises an instant delivery service request entry for the recommended object;
wherein, before displaying a first page corresponding to the recommended object, the method further comprises:
determining the target provider from a set of candidate providers.

3. The method of claim 2, wherein, the determining the target provider from a set of candidate providers comprises:
determining a set of candidate providers to which the recommended object belongs; and
selecting the target provider from at least two providers included in the set of candidate provides that meets a preset delivery distance requirement and supports the instant delivery service, based on at least one of user's positioning information and instant delivery destination information.

4. The method of claim 2, wherein, the instant delivery service page also comprises an instant delivery service application entry corresponding to a set recommended object provided by the target provider.

5. The method of claim 1, wherein, the first page comprises a main service page of a provider of the recommended object, the main service page comprises an entry to a second page, and the second page comprises an instant delivery service page of the provider of the recommended object.

6. The method of claim 5, wherein, a preset number of alternative recommended objects provided by the provider of the recommended object can be displayed at the entry to the second page.

7. The method of claim 6, wherein, after displaying a first page corresponding to the recommended object, the method further comprises:

receiving a second trigger operation acting on a target alternative recommended object;

in response to the second trigger operation, displaying the second page, wherein in the second page, an instant delivery service request entry for the target alternative recommended object can be displayed in a first preset display manner, and an instant delivery service application entry corresponding to a preset recommended object can be displayed in a second preset display manner, the preset recommended object may comprise a recommended object in the second page other than the target alternative recommended object, and the first and second preset display manners are different.

8. The method of claim 6, wherein, before displaying the second page, the method further comprises:

determining a target provider from a set of candidate providers;

wherein when the second page is displayed, the method further comprises:

in a case it is detected that the provider of the recommended object corresponding to the second page is inconsistent with the target provider, displaying inquiry information for switching to an instant delivery service page corresponding to the target provider.

9. The method of claim 1, wherein, the recommended object corresponds to at least one of associated providers, and the associated providers are used to provide recommended objects belonging to a same category as the recommended object; the first page comprises an aggregation service page for a provider of the recommended object and the associated providers, the aggregation service page comprises entries to instant delivery service pages corresponding to the provider of the recommended object and the associated providers respectively.

10. An electronic device, comprising a memory having a computer program stored thereon, and a processor, wherein the processor, when executing the computer program, implements:

presenting a video stream containing a recommended object in a video stream push page of a preset application;

in a case where the recommended object supports the instant delivery service, presenting an original control for interactive operation to reused as a preset control in the video stream push page of the preset application, and displaying instant delivery service prompt information at a preset position in the video stream push page corresponding to the preset control;

receiving a first trigger operation acting on the preset control; and in response to the first trigger operation, displaying a first page corresponding to the recommended object, wherein the instant delivery service for the recommended object is provided on the first page, wherein, in a case where the recommended object does not support the instant delivery service, the presentation of the preset control in the video stream push page of the preset application is omitted.

11. The electronic device of claim 10, wherein, the first page can comprise an instant delivery service page of a target provider, the target provider is used for providing the recommended object, and the instant delivery service page comprises an instant delivery service request entry for the recommended object;

wherein, the processor, when executing the computer program, implements: before displaying a first page corresponding to the recommended object, determining a set of candidate providers to which the recommended object belongs; and selecting the target provider from at least two providers included in the set of candidate provides that meets a preset delivery distance requirement and supports the instant delivery service, based on at least one of user's positioning information and instant delivery destination information.

12. The electronic device of claim 10, wherein, the first page comprises an entry to a second page, and the second page comprises the instant delivery service page of a provider of the recommended object, and wherein the processor, when executing the computer program, implements: after displaying a first page corresponding to the recommended object, receiving a second trigger operation acting on a target alternative recommended object;

in response to the second trigger operation, displaying the second page, wherein in the second page, an instant delivery service request entry for the target alternative recommended object can be displayed in a first preset display manner, and an instant delivery service application entry corresponding to a preset recommended object can be displayed in a second preset display manner, the preset recommended object may comprise a recommended object in the second page other than the target alternative recommended object, and the first and second preset display manners are different.

13. The electronic device of claim 10, wherein, the first page comprises an entry to a second page, and the second page comprises an instant delivery service page of a provider of the recommended object, and wherein the processor, when executing the computer program, implements: before displaying the second page, determining a target provider from a set of candidate providers;

wherein when the second page is displayed, the method further comprises:

in a case it is detected that the provider of the recommended object corresponding to the second page is inconsistent with the target provider, displaying inquiry information for switching to an instant delivery service page corresponding to the target provider.

14. A non-transitory computer-readable storage medium storing a computer program, wherein the computer program, when executed by a processor, causes the processor to implement:

presenting a video stream containing a recommended object in a video stream push page of a preset application;

in a case where the recommended object supports the instant delivery service, presenting an original control for interactive operation to reused as a preset control in the video stream push page of the preset application, and displaying instant delivery service prompt information at a preset position in the video stream push page corresponding to the preset control;

receiving a first trigger operation acting on the preset control; and in response to the first trigger operation, displaying a first page corresponding to the recommended object, wherein the instant delivery service for the recommended object is provided on the first page, wherein, in a case where the recommended object does not support the instant delivery service, the presentation of the preset control in the video stream push page of the preset application is omitted.

15. The non-transitory computer-readable storage medium of claim 14, wherein, the first page can comprise an instant delivery service page of a target provider, the target provider is used for providing the recommended object, and the instant delivery service page comprises an instant delivery service request entry for the recommended object;

wherein, the computer program, when executed by a processor, causes the processor to implement: before displaying a first page corresponding to the recommended object, determining a set of candidate providers to which the recommended object belongs; and selecting a target provider from at least two providers included in the set of candidate provides that meets a preset delivery distance requirement and supports the instant delivery service, based on at least one of user's positioning information and instant delivery destination information.

16. The non-transitory computer-readable storage medium of claim 14, wherein, the first page comprises an entry to a second page, and the second page comprises an instant delivery service page of a provider of the recommended object, and wherein the computer program, when executed by a processor, causes the processor to implement: after displaying a first page corresponding to the recommended object, receiving a second trigger operation acting on the target alternative recommended object;

in response to the second trigger operation, displaying the second page, wherein in the second page, an instant delivery service request entry for the target alternative recommended object can be displayed in a first preset display manner, and the instant delivery service application entry corresponding to a preset recommended object can be displayed in a second preset display manner, the preset recommended object may comprise a recommended object in the second page other than the target alternative recommended object, and the first and second preset display manners are different.

17. The non-transitory computer-readable storage medium of claim 14, wherein, the first page comprises an entry to a second page, and the second page comprises an instant delivery service page of a provider of the recommended object, and wherein the computer program, when executed by a processor, causes the processor to implement: before displaying the second page, determining a target provider from a set of candidate providers;

wherein when the second page is displayed, the method further comprises:

in a case it is detected that the provider of the recommended object corresponding to the second page is inconsistent with the target provider, displaying inquiry information for switching to an instant delivery service page corresponding to the target provider.

* * * * *